United States Patent Office 3,216,996
Patented Nov. 9, 1965

3,216,996
1-METHYL PREGNANES
William J. Wechter and John C. Babcock, both of Kalamazoo, Mich., assignors to The Upjohn Company, Kalamazoo, Mich., a corporation of Delaware
No Drawing. Filed Mar. 23, 1962, Ser. No. 182,107
3 Claims. (Cl. 260—239.55)

This invention relates to novel steroid compounds and to processes for their preparation and is more particularly concerned with novel 1-methylcortisone, 1-methylhydrocortisone, the corresponding $\Delta^1$-derivatives thereof, and 9$\alpha$-halo derivatives thereof, as well as with the 21-acylates of these compounds and with intermediates in, the processes for, the preparation thereof.

The novel compounds of the invention can be represented by the following formulae:

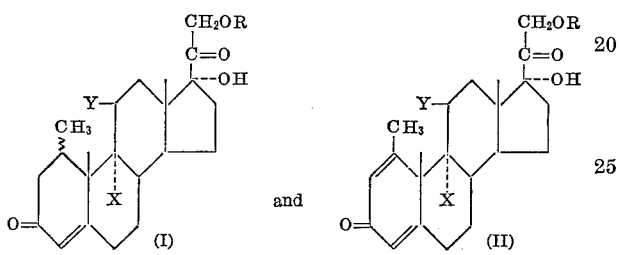

wherein R is selected from the class consisting of hydrogen and the acyl radical of a hydrocarbon carboxylic acid containing from 1 to 12 carbon atoms, inclusive, X is selected from the class consisting of hydrogen, fluorine, chlorine, fromine, and iodine, and Y is an 11-substituent selected from the class consisting of $\beta$-hydroxy and keto. The wavy line, when used in the above formulae and throughout the specification, is a generic expression denoting the $\alpha$- or $\beta$-configuration and mixtures thereof.

The organic carboxylic acids, from which the acylates of the invention are derived, include saturated and unsaturated aliphatic acids and aromatic acids such as acetic, propionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, p-hexyloxyphenylpropionic, p-butyloxyphenylpropionic, succinic, glutaric acids, and the like.

The novel compounds of the invention having the Formulae I and II above possess valuable therapeutic properties. Illustratively the compounds of the invention exhibit anti-inflammatory activity with minimal side-effects and are therefore valuable for topical use in mammals, particularly in valuable domestic animals. Thus, the compounds of the invention are valuable when administered topically for the alleviation of inflammations and burns, and also in the treatment of atopic dermatitis and contact dermatitis.

In addition the compounds of the invention exhibit properties commonly associated with corticoids and are valuable for use in animals in intravenous therapy such as in the treatment of acute adrenal crises, acute surgical emergencies and acute stressful situations.

In addition, the compounds of the invention having the Formulae I and II above are active as antihormonal agents, as cardiotonic agents and as sedatives.

The compounds of the invention having the Formulae I and II above can be prepared and administered to mammals, including valuable domestic animals, and to birds, in a wide variety of oral or parenteral dosage forms, singly, or in admixture with other active compounds. They can be associated with a pharmaceutical carrier which can be solid material or a liquid in which the compound is dissolved, dispersed, or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

The novel compounds of the invention having the Formulae I and II wherein X is hydrogen can be prepared by processes which are set forth schematically in the following reaction scheme:

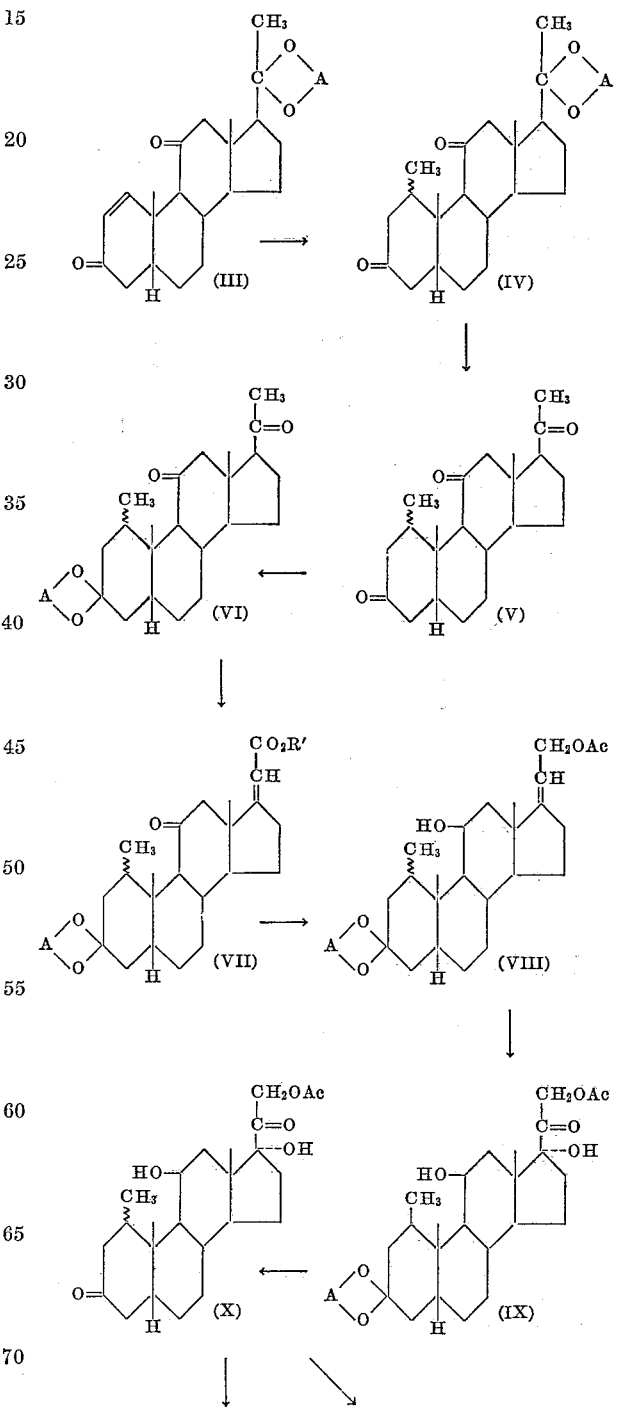

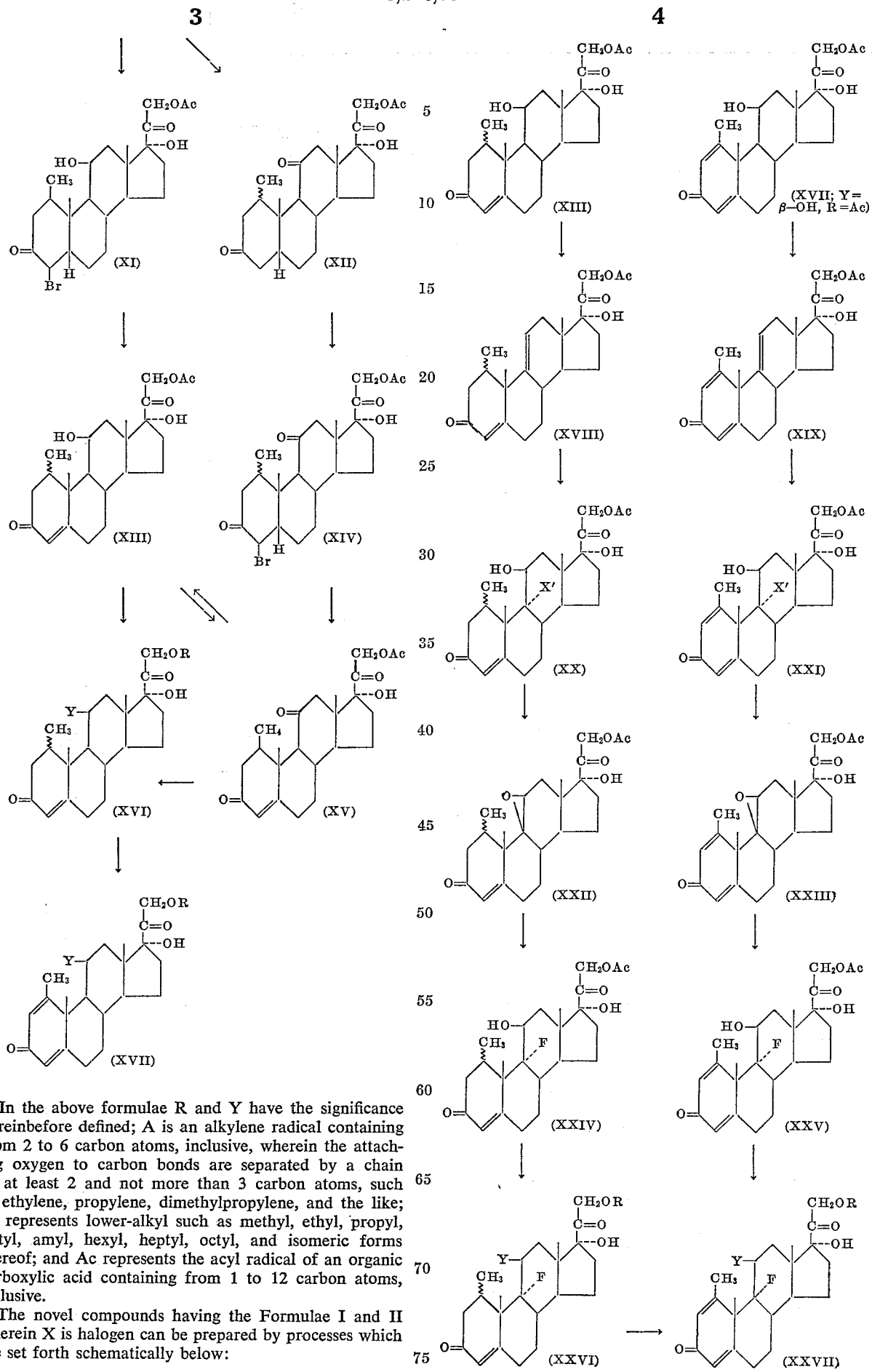

In the above formulae R and Y have the significance hereinbefore defined; A is an alkylene radical containing from 2 to 6 carbon atoms, inclusive, wherein the attaching oxygen to carbon bonds are separated by a chain of at least 2 and not more than 3 carbon atoms, such as ethylene, propylene, dimethylpropylene, and the like; R' represents lower-alkyl such as methyl, ethyl, propyl, butyl, amyl, hexyl, heptyl, octyl, and isomeric forms thereof; and Ac represents the acyl radical of an organic carboxylic acid containing from 1 to 12 carbon atoms, inclusive.

The novel compounds having the Formulae I and II wherein X is halogen can be prepared by processes which are set forth schematically below:

In the above formulae Ac, Y and R have the significance hereinbefore defined and X' is chlorine, bromine, or iodine.

The compounds represented in the above reaction schemes by the Formulae XIII, XV, XVI, XVII, XX, XXI, XIV, XV, XXVI, and XXVII are embraced within the generic Formulae I and II which latter represent the novel compounds of the present invention.

The process for the preparation of the novel compounds of the invention comprises the following steps:

The 20-alkylene ketol of 5β-pregn-1-ene-3,11,20-trione (III) is treated with a methyl magnesium halide in the presence of a catalyst such as cuprous chloride, cuprous bromide, and the like, to obtain the corresponding 20-alkylene ketal of 1-methyl-5β-pregnane-3,11,20-trione (IV). The reaction is carried out in the presence of an inert organic solvent such as diethyl ether, tetrahydrofuran, and like solvents commonly employed in Grignard reactions. Preferably the methylmagnesium halide is employed in excess of stoichiometric proportions. The desired compound (IV) is isolated by conventional procedures, for example, by decomposing the reaction mixture using ammonium chloride, aqueous mineral acid and the like, followed by solvent extraction and evaporation of the solvent extract. There is thus obtained a mixture of the 1α- and 1β-epimers of the desired product, which mixture can be separated into its component parts by conventional procedures such as chromatography, counter-current distribution, and the like.

Either of the individual 1α- and 1β-epimers of (IV) or the mixture of said epimers obtained as described above can be subjected to the following sequence of reactions. Where the mixture of the epimers is employed in said reactions there will be obtained a mixture of 1α- and 1β-epimers of the various products and such mixtures can be separated at any stage, if desired, by conventional procedures such as chromatography, counter-current distribution, and the like.

In the following description the term "1-methyl" is employed generically as indicating the α- or β-epimer or mixtures thereof, unless otherwise stated specifically.

The 20-alkylene ketal of 1-methyl-5β-pregnane-3,11,20-trione (IV) is hydrolyzed, for example, using mineral acid in solution in a suitable solvent such as acetone or a lower alkanol such as methanol, ethanol, isopropyl alcohol and the like, to obtain the corresponding 1-methyl-5β-pregnane-3,11,20-trione (V).

The 3-keto group of 1-methyl-5β-pregnane-3,11,20-trione (V) so obtained is then selectively ketalized using procedures known in the art. For example, the compound (V) is treated with the appropriate alkylene glycol in the presence of selenium dioxide and an inert solvent such as chloroform, methylene chloride, and the like. The reaction is advantageously carried out at room temperature, i.e., of the order of 25° C. and the desired 3-alkylene ketal (VI) is isolated from the reaction mixture by conventional procedures, for example, by removal of the solvent and purification of the residue by recrystallization, chromatography, and the like.

The 3-alkylene ketal of 1-methyl-5β-pregnane-3,11,20-trione (VI) is converted to the corresponding 3-alkylene ketal of an alkyl 3,11-diketo-5β-pregn-17(20)-ene-21-oate (VII) using the following procedure. The 3-ketal (VI) is reacted with more than 2 molar equivalents each of an alkyl diester of oxalic acid, preferably dimethyl or diethyl oxalate, and a base, preferably sodium methoxide or ethoxide or potassium tert.-butoxide, to produce the alkali metal enolate of the 3-alkylene ketal of 21-alkoxyoxalyl-1-methyl-5β-pregnane-3,11,20-trione. The latter compound is then treated, preferably without isolation from the previous reaction mixture, with chlorine or bromine in the presence of a lower aliphatic carboxylic acid, preferably acetic acid to produce the corresponding 3-alkylene ketal of 21-alkoxyoxalyl-21,21-dihalo-1-methyl-5β-pregnane-3,11,20-trione. The latter compound is then subjected, preferably without isolation from the above reaction mixture, to rearrangement in the presence of a strong base, for example, an alkali-metal alkoxide such as sodium methoxide, sodium ethoxide, potassium methoxide, and the like, in the presence of an inert solvent, preferably a lower alkanol such as methanol, ethanol, and the like, to produce the desired 3-alkylene ketal of an alkyl 3,11-diketo-5β-pregn-17(20)-ene-21-oate (VII). The latter compound can be isolated from the reaction mixture using procedures known in the art, for example, by diluting the reaction mixture with water, separating and evaporating the organic layer and purifying the residue by recrystallization, chromatography or other standard procedures.

The 3-alkylene ketal of the Faworskii ester (VII) is then reduced, preferably using lithium aluminum hydride, in the presence of an inert organic solvent, for example, ether, dioxane, tetrahydrofuran, benzene, and the like, to produce the corresponding 3-alkylene ketal of 1-methyl-11β,21-dihydroxy-5β-pregn-17(20)-en-3-one. The latter compound is isolated from the reaction mixture by conventional procedures, for example, by decomposing the reaction mixture with water or an acid or lower aliphatic carboxylic acid alkyl ester followed by water, followed by isolation and evaporation of the organic layer. The usual reaction conditions for a lithium aluminum hydride reduction are employed, except that a reaction temperature of about 25° C. or below is preferred, and acid, although operative and satisfactory under carefully controlled conditions, is preferably not employed in the decomposition step, to avoid undue hydrolysis of the ketal group.

The 3-alkylene ketal of 1-methyl-11β,21-dihydroxy-5β-pregn-17(20)-en-3-one so obtained can be acylated using conventional procedures, for example, by reaction with the appropriate acid anhydride or acid halide in the presence of a tertiary base, to obtain the corresponding 21-acylate (VIII).

In the next step of the process of the invention the 21-acylate (VIII) is oxidatively hydroxylated with osmium tetroxide and an oxidizing reagent, for example, hydrogen peroxide, an organic peracid, an amine oxide peroxide, or an aryl iodo oxide, in the manner described in U.S. Patents 2,769,825, 2,769,824, 2,769,823, 2,875,217, or in Hogg et al., J. Am. Chem. Soc., 77, 4436 (1955), to produce the corresponding 3-alkylene ketal of 1-methyl-11β,17α,21 - trihydroxy - 5β - pregnane-3,20-dione 21-acylate (IX).

The 3-alkylene ketal (IX) can be hydrolyzed using conventional procedures as described above to produce 1-methyl-11β,17α,21-trihydroxy-5β-pregnane-3,20 - dione 21-acylate (X).

In the next stage of the process of the invention the compound (X) is brominated using free bromine in the presence of an inert organic solvent, preferably a lower aliphatic fatty acid such as acetic acid, propionic acid and the like, to produce the corresponding 1-methyl-4-bromo-11β,17α,21-trihydroxy-5β-pregnane-3,20-dione 21-acylate (XI). Advantageously the bromine is employed in a slight excess over the stoichiometric proportion. The reaction is conducted at about 25° C. or slightly below. The 4-bromo compound (XI) so obtained can be isolated by conventional procedures, for example, by pouring into water and isolating the solid which separates. The crude 4-bromo compound (XI) can be purified, if desired, by conventional procedures such as recrystallization, but is generally employed without purification in the preparation of the Δ⁴-3-keto compound as described below.

The 4-bromo compound (XI) can be dehydrobrominated by conventional procedures, for example, by reaction with semicarbazide to form the semicarbazone of the corresponding Δ⁴-3-keto compound followed by hydrolysis of the semicarbozone by conventional procedures, for example, by heating with pyruvic acid solution, to obtain the corresponding 1-methyl-11β,17α,21-trihydroxypregn-4-ene-3,20-dione 21-acylate (XIII), i.e., 1-methylhydrocortisone 21-acylate. The latter compound (XIII) can then be oxidized to the corresponding 11-keto compound (XV), i.e., 1-methylcortisone 21-acylate using procedures well known in the art for conversion of hydrocortisone 21-acylates to cortisone 21-acylates.

Alternatively, the above-described steps of bromination and dehydrobromination followed by oxidation of the 11β-hydroxy group to 11-keto can be carried out in a different order. Thus the compound (X) can be first oxidized using the procedures referred to above to produce the corresponding 11-keto compound (XII), the latter compound can be brominated as described above to produce the corresponding 4-bromo compound (XIV) and the latter can be dehydrobrominated using the procedures described above to produce the corresponding 1-methylcortisone 21-acylate (XV).

The 1-methylhydrocortisone 21-acylate (XIII) and the 1-methylcortisone 21-acylate (XV) can be converted to the corresponding free 21-alcohols using hydrolysis procedures known in the art, for example, by reaction with a base, for example, an alkali metal carbonate or bicarbonate or an alkali metal alkoxide such as sodium ethoxide, potassium methoxide, and the like, in the presence of an organic solvent such as a lower alkanol, for example, methanol, ethanol, and the like. The free 21-alcohols so obtained can be reacylated, if desired, using procedures set forth above, to form other 21-acylates of the Formulae XIII and XV.

The compounds 1-methylcortisone, 1-methylhydrocortisone and the 21-acylates thereof, represented generically by the Formula XVI can be subjected to 1-dehydrogenation using procedures known in the art to produce the corresponding 1-dehydro compounds (XVII). For example, the 1-dehydrogenation can be accomplished by chemical means using selenium dioxide according to the procedure described by Meystre et al., Helv. Chim. Acta., 39, 734 (1956), or that described in British patent specification No. 864,414. The 1-dehydrogenation can also be effected microbiologically using microorganisms known in the art for effecting 1-dehydrogenation of steroids, for example, microorganisms of the genera Calonectria, Alternaria, Collelotrichum, Cylindrocarpon, Ophiobolus, Septomyxa, Didymella, Corynebacterium, Fusarium, Listeria, and Erysipelothrix, under reaction conditions such as are described in U.S. Patents 2,602,769 and 2,897,218.

Where the 1-dehydrogenation is effected by microbiological means any 21-acyl group will generally be removed during the reaction. The free 21-alcohols of the Formula XVII (R=H) can be acylated by the procedures hereinbefore described to produce the corresponding 21-acylates (XVII; R=Ac). Similarly the 21-acylates of the Formula XVII can be hydrolyzed to the corresponding free alcohols using the procedures hereinbefore described.

The 9α-halo compounds of the invention (I, II; X=halogen) can be prepared using standard procedures known in the art. Thus the 1-methylhydrocortisone 21-acylate (XIII) and the 1-methylprednisolone 21-acylate (XVII) can be dehydrated using standard procedures, for example, by reaction with an N-haloamide followed by anhydrous sulfur dioxide using the procedure set forth in U.S. Patent 3,005,834, or with methanesulfonyl chloride or toluenesulfonyl chloride in the presence of pyridine to produce the corresponding 9(11)-dehydro compounds (XVIII) and (XIX), respectively.

The 9(11)-dehydro compounds (XVIII) and (XIX) are then treated with a hypohalous acid, i.e., hypochlorous, hypoiodous or hypobromous aicd, generally by reaction of the 9(11)-dehydro compound with perchloric acid in the presence of the appropriate N-haloamide or N-haloimide, such as N-bromoacetamide, N-iodosuccinimide, N-chlorosuccinimide and the like, using conditions well known in the art, to produce the corresponding 11β-hydroxy-9α-halo compounds (XX) and (XXI), respectively.

The 11β-hydroxy-9α-halo compounds (XX) and (XXI) are then treated by conventional procedures, for example, with a base such as potassium acetate, sodium hydroxide and the like, to form the corresponding 9β,11β-epoxy compounds (XXII) and (XXIII), respectively.

The 9β,11β-epoxy compounds (XXII) and (XXIII) can be reacted with hydrogen fluoride under anhydrous or aqueous conditions using procedures well known in the art to produce the corresponding 9α-fluoro-11β-hydroxy compounds (XXIV) and (XXV). The 21-acyloxy groups of the compounds (XXIV) and (XXV) can be hydrolyzed using procedures already described above to produce the corresponding free 21-alcohols and the latter can then be reacylated, if desired, using procedures described above to produce other 21-acylates of the Formulae XXIV and XXV.

The 9α-fluoro-11β-hydroxy compounds (XXIV) and (XXV) can be oxidized, using procedures hereinbefore described, to produce the corresponding 9α-fluoro-11-keto compounds [(XXVI) and (XXVII); Y=keto; R=acyl] and the 21-acyloxy groups of the latter can be hydrolyzed using procedures described above to give the corresponding free 21-alcohols which in turn can be reacylated using procedures already described to produce other 21-acylates [(XXVI) and (XXVII); Y=keto; R=acyl].

The compounds (IV), (V) and (VI) above, in addition to their usefulness as intermediates in the process of the invention, also possess valuable therapeutic activity. Illustratively, the compounds (IV), (V) and (VI) possess central nervous system depressant activity which renders them valuable, for example, as sedatives and general anesthetics in the manipulation of laboratory animals and in the treatment of animals in veterinary medicine procedures. For therapeutic purposes the compounds (IV), (V) and (VI) can be formulated in the manner described above for the compounds (I) and (II) of the invention.

In addition the compounds (IV) and (V) are also useful as intermediates in the preparation of 1-methylpregna-1,4-diene-3,11,20-trione. Thus (IV) can be hydrolyzed to yield (V) as described previously and the latter compound can be dehydrogenated using chemical or microbiological means as described above, to form 1-methylpregna-1,4-diene-3,11,20-trione. Alternatively (IV) can be subjected to dehydrogenation followed by hydrolysis to produce the compound 1-methylpregna-1,4-diene-3,11,20-trione. The latter compound possesses pharmacological utility. Illustratively, the compound possesses central nervous system regulating activity and can be used as a sedative and general anesthetic in the manipulation of laboratory animals and in routine veterinary medicine practice. For therapeutic use the compound is formulated using the procedures hereinbefore described for the compounds (I) and (II) of the invention.

The compounds having the Formula III which are employed as starting materials in the process of the invention are obtained as described in U.S. Patent 2,981,659, Example 1A, wherein there is given the preparation of 5β-pregn-1-ene-3,11,20-trione 20-ethylene ketal. Other 20-alkylene ketals of 5β-pregn-1-ene-3,11,20-trione can be prepared in like manner from the corresponding 20-alkylene ketals of 5β-pregnane-3,11,20-trione.

The following examples are illustrative of the process and products of the present invention, but are not to be construed as limiting.

*Example 1.—1β-methtyl-5β-pregnane-3,11,20-trione 20-ethylene ketal*

A solution of 2.5 g. (6.7 millimoles) of 5β-pregn-1-ene-3,11,20-trione 20-ethylene ketal in 50 ml. of purified tetrahydrofuran containing 0.2 g. of cuprous bromide was cooled in an ice bath and treated dropwise with stirring with a solution of 5 ml. of 3 M methylmagnesium bromide in 10 ml. of purified tetrahydrofuran containing 0.2 g. of cuprous bromide. After the addition was complete the stirring was continued for 2 hr. while the solution was allowed to reach room temperature (about 25° C.). The reaction mixture was then cooled and decomposed by the addition of excess saturated aqueous ammonium chloride solution. The resulting mixture was diluted with ether and the organic layer was separated, washed with saturated ammonium chloride solution followed by saturated brine solution and then dried over anhydrous sodium sulfate. The dried solution was filtered and the filtrate was evaporated to dryness. The residue was chromatographed on a column of magnesium silicate (Florisil) and the column was eluted with commercial hexanes (Skellysolve B) containing increasing proportions of acetone. Those fractions which, on the basis of infrared and paper chromatographic analysis, were found to contain the desired compounds were combined, evaporated to dryness and the residues recrystallized from a mixture of acetone and Skellysolve B. There were thus obtained the following materials.

(a) 1.6 g. of 1$\beta$-methyl-5$\beta$-pregnane-3,11,20-trione 20-ethylene ketal in the form of a crystalline solid having a melting point of 163 to 167° C. An analytical sample having a melting point of 165.5 to 169° C. was obtained by further recrystallization from a mixture of Skellysolve B and acetone.

*Analysis.*—Calcd. for $C_{24}H_{36}O_4$: C, 74.19; H, 9.34. Found: C, 74.46; H, 9.75.

The infrared spectrum of the compound (mineral oil mull) exhibited maxima at 1700, 1330, 1070, and 1047 reciprocal centimeters.

(b) 1$\alpha$-methyl-5$\beta$-pregnane-3,11,20-trione 20-ethylene ketal in the form of a crystalline solid.

Using the above procedure, but replacing 5$\beta$-pregn-1-ene-3,11,20-trione 20-ethylene ketal by other 20-alkylene ketals, for example, the 20-(1,2-propylene ketal), and 20-(2,2-dimethyl-1,2-propyleneketal), of 5$\beta$-pregn-1-ene-3,11,20-trione, there are obtained the corresponding 20-alkylene ketals of 1$\alpha$- and 1$\beta$-methyl-5$\beta$-pregnane-3,11,20-trione.

Example 2.—1$\beta$-methyl-5$\beta$-pregnane-3,11,20-trione

A solution of 1.5 g. of 1$\beta$-methyl-5$\beta$-pregnane-3,11,20-trione 20-ethylene ketal in 25 ml. of ethanol was treated with 10 ml. of 3 N hydrochloric acid and the mixture was heated on a steam bath for 3 hr. The resulting mixture was diluted with hot water and cooled to room temperature. The solid which separated was isolated by filtration and recrystallized twice from a mixture of Skellysolve B and acetone. There was thus obtained 0.51 g. of 1$\beta$-methyl-5$\beta$-pregnane-3,11,20-trione in the form of a crystalline solid having a melting point of 169 to 173° C. An analytical sample having a melting point of 172 to 174° C. was obtained by further recrystallization from the same solvent mixture.

*Analysis.*—Calcd. for $C_{22}H_{32}O_3$: C, 76.70; H, 9.36. Found: C, 76.79; H, 9.52.

The infrared spectrum of the compound (mineral oil mull) exhibited maxima at 1697 and 1690 reciprocal centimeters.

Using the above procedure, other 20-alkylene ketals of 1$\beta$-methyl-5$\beta$-pregnane-3,11,20,-trione such as the 20-(1,2-propylene ketal) are hydrolyzed to 1$\beta$ - methyl - 5$\beta$-pregnane-3,11,20-trione.

Using the above procedure but replacing 1$\beta$-methyl-5$\beta$-pregnane-3,11,20-trione 20-ethylene ketal by the corresponding 1$\alpha$-epimer there is obtained 1$\alpha$-methyl-5$\beta$-pregnane-3,11-20-trione.

Example 3.—1$\beta$-methyl-5$\beta$-pregnane-3,11,20-trione 3-ethylene ketal A mixture of 10.5 g. of 1$\beta$-methyl-5$\beta$-pregnane-3,11,20-trione, 10.5 g. of selenium dioxide, 150 ml. of ethylene glycol and 100 ml. of alcohol-free chloroform was stirred for 4 days at approximately 25° C. The resulting mixture was poured into water containing excess potassium carbonate. The organic layer was separated and the aqueous layer was extracted twice with methylene chloride. The combined organic layer and methylene chloride extracts were dried over anhydrous sodium sulfate and evaporated to dryness. The residue was chromatographed on a column of magnesium silicate (Florisil) and the column was eluted with Skellysolve B containing increasing proportions of acetone. Those fractions which, on the basis of infrared and paper-gram analysis, were found to contain the desired compound were combined and evaporated to dryness. The residue was recrystallized from a mixture of Skellysolve B and acetone. There was thus obtained 4.42 g. of 1$\beta$-methyl-5$\beta$-pregnane-3,11,20-trione 2-ethylene ketal in the form of a crystalline solid having a melting point of 161 to 164.5° C. An analytical sample having a melting point of 163 to 164° C. was obtained by further recrystallization from the same solvent mixture.

*Analysis.*—Calcd. for $C_{24}H_{36}O_4$: C, 74.19; H, 9.34. Found: C, 74.28; H, 9.26.

In similar manner but replacing ethylene glycol by other alkylene glycols there are obtained the corresponding 3-alkylene ketals, such as the 3-(1,2-propylene ketal) and 3-(2,2-dimethyl-1,2-propylene ketal), of 1$\beta$-methyl-5$\beta$-pregnane-3,11,20-trione.

Using the above procedure, but replacing 1$\beta$-methyl-5$\beta$-pregnane-3,11,20-trione by the corresponding 1$\alpha$-epimer, there is obtained 1$\alpha$-methyl-5$\beta$-pregnane-3,11,20-trione 3-ethylene ketal.

Example 4.—Methyl 1$\beta$-methyl-3,11-diketo-5$\beta$-pregn-17(20)-ene-21-oate 3-ethylene ketal A total of 5.1 g. (35 millimoles) of diethyl oxalate was added to a solution of 4.42 g. (11.9 millimoles) of 1$\beta$-methyl-5$\beta$-pregnane-3,11,20-trione 3-ethylene ketal in 75 ml. of t.-butyl alcohol maintained at 55° C. under an atmosphere of nitrogen. When the addition was complete the heating was stopped and 5.06 g. of 25 percent solution of sodium methoxide in methanol was added rapidly to the mixture. The resulting mixture was allowed to cool to room temperature over a period of 1 hr. before adding 1.42 g. (23.72 millimoles) of glacial acetic acid followed by a solution of 1.95 g. (23.72 millimoles) of sodium acetate in 50 ml. of methanol. The resulting solution was cooled to about 0° C. and 3.04 g. (24 millimoles) of bromide in 40 ml. of cold methanol was added dropwise with stirring over a period of 10 minutes. Stirring of the mixture was continued and 5 minutes after the addition of bromine solution was complete, 13.65 g. of a 25 percent solution of sodium methoxide in methanol was added. The mixture so obtained was stirred at room temperature overnight and then filtered. The filtrate was diluted with water and the organic solvent was removed by distillation under reduced pressure. The residual aqueous mixture was extracted with methylene chloride. The extract was dried over anhydrous sodium sulfate and chromatographed on a column of magnesium silicate. The column was eluted with Skellysolve B containing increasing proportions of acetone and those fractions which, on the basis of infrared and papergram analysis, were found to contain the desired product, were combined and evaporated to dryness. The residue was recrystallized from Skellysolve B to obtain 2.43 g. of methyl 1$\beta$-methyl-3,11-diketo-5$\beta$-pregn-17(20)-ene-21-oate 3-ethylene ketal in the form of a crystalline solid having a melting point of 137 to 143° C. An analytical sample having a melting point of 148.5 to 150° C. was obtained by further recrystallization from the same solvent.

*Analysis.*—Calcd. for $C_{25}H_{36}O_5$: C, 72.08; H, 8.71. Found: C, 72.03; H, 8.89.

The infrared spectrum of the compound (mineral oil mull) exhibited maxima at 1718, 1703 and 1655 reciprocal centimeters. The ultraviolet spectrum of the compound (ethanol solution) exhibited a maximum at 233 millimicrons ($\epsilon$=11,750).

Similarly, using the above procedure, but replacing the 3-ethylene ketal of 1$\beta$-methyl-5$\beta$-pregnane-3,11,20-trione by other 3-alkylene ketals thereof, such as the 3-

(1,2-propylene ketal) and 3-(2,2-dimethyl-1,2-propylene ketal), there are obtained the corresponding 3-alkylene ketals of methyl 1β-methyl-3,11-diketo-5β-pregn-17(20)-ene-21-oate.

Similarly, using the above procedure, but replacing 1β-methyl-5β-pregnane-3,11,20-trione 3-ethylene ketal by the corresponding 1α-epimer, there is obtained methyl 1α - methyl - 3,11 - diketo - 5β - pregn - 17(20) - ene-21-oate 3-ethylene ketal.

*Example 5.—1β-methyl-11β,21-dihydroxy-5β-pregn-17 (20)-ene-3-one 3-ethylene ketal 21-acetate*

A solution of 2.3 g. (5.5 millimoles) of methyl 1β-methyl-3,11-diketo-5β-pregn-17(20)-en-21-oate 3-ethylene ketal in 25 ml. of ether was added to a suspension of 0.76 g. (20 millimoles) of lithium aluminum hydride in 25 ml. of ether at room temperature. The resulting mixture was stirred for 1 hr. at the same temperature and then excess lithium aluminum hydride was decomposed by the addition of 0.5 ml. of ethyl acetate followed by 1.5 ml. of water. The ether layer was decanted and washed with saturated brine solution before being dried over anhydrous sodium sulfate. The dried solution was filtered and the filtrate was evaporated to dryness under reduced pressure. The residue was dissolved in a mixture of 10 ml. of pyridine and 2 ml. of acetic anhydride and allowed to stand at room temperature overnight. The resulting solution was diluted with water and the gum which separated was washed with water by decantation and then partitioned between a mixture of ether and water. The ether layer was separated, washed with water and with saturated brine solution and dried over anhydrous sodium sulfate. The dried solution was filtered and the filtrate was evaporated to dryness. Toluene was added to the residue and the mixture was distilled under reduced pressure to remove residual pyridine. The residue was recrystallized from a mixture of acetone and Skellysolve B. There was thus obtained 1.04 g. of 1β-methyl-11β,21-dihydroxy-5β-pregn-17(20)-en 3-one 3-ethylene ketal 21-acetate in the form of a crystalline solid having a melting point of 141.2 to 143° C. An analytical sample having a melting point of 144 to 145° C. was obtained by further recrystallization from Skellysolve B.

*Analysis.*—Calcd. for $C_{26}H_{40}O_5$: C, 72.19; H, 9.32. Found: C, 71.86; H, 9.18.

The infrared spectrum of the compound (mineral oil mull) exhibited maxima at 3560, 1725, 1673 and 1265 reciprocal centimeters.

Using the above procedure, but replacing the 3-ethylene ketal of methyl 3,11-diketo-5β-pregn-17(20)-en-21-oate by other 3-alkylene ketals thereof such as the 3-(1,2-propylene ketal) and 3-(2,2-dimethyl-1,2-propylene ketal), there are obtained the corresponding 3-alkylene ketals of 1β-methyl-11β,21-dihydroxy-5β-pregn-17(20)-en-3-one 21-acetate.

Similarly, using the above procedure, but replacing methyl 1β-methyl-3,11-diketo-5β-pregn-17(20)-en-21-oate 3-ethylene ketal by the corresponding 1β-epimer, there is obtained 1α - methyl - 11β,21 - dihydroxy - 5β - pregn-17(20)-en-3-one 3-ethylene ketal 21-acetate.

*Example 6.—1β-methyl-11β,17α, 21-trihydroxy-5β-pregnane-3,20-dione 3-ethylene ketal 21-acetate*

A solution of 0.88 g. (20 millimoles) of 1β-methyl-11β, 21-dihydroxy-5β-pregn-17(20)-en-3-one 3-ethylene ketal 21-acetate in 40 ml. of t.-butyl alcohol was treated with 1 drop of pyridine, 2.4 ml. of 4 N N-methylmorpholine oxide peroxide in t.-butyl alcohol and a solution of 4.8 mg. of osmium tetroxide in 1.9 ml. of t.-butyl alcohol. The resulting solution was allowed to stand in an atmosphere of nitrogen overnight and was then stirred with an aqueous solution of 80 mg. of sodium hydrosulfite for 0.5 hr. The mixture so obtained was evaporated to dryness in vacuo and the residue was dissolve in methylene chloride. The methylene chloride solution was washed with water and dried over anhydrous sodium sulfate. The dried solution was filtered and the filtrate was chromatographed on a column of magnesium silicate (Florisil). The column was eluted with Skellysolve B containing increasing proportions of acetone and those fractions which, on the basis of infrared and papergram analysis, were found to contain the desired compound were combined and evaporated to dryness. The residue was recrystallized from a mixture of acetone and Skellysolve B. There was thus obtained 0.67 g. of 1β-methyl-11β, 17α,21-trihydroxy-5β-pregnane-3,20-dione-2-ethylene ketal 21-acetate in the form of a crystalline solid having a melting point of 192.5 to 204° C. The infrared spectrum of the compound (mineral oil mull) exhibited maxima at 3420, 1735 and 1720 reciprocal centimeters.

Using the above procedure, but replacing the 3-ethylene ketal of 1β-methyl-11β,21-dihydroxy-5β-pregn-17 (20)-en-3-one by other 3-alkylene ketals such as the 3-(1,2-propylene ketal) and 3-(2,2-dimethyl-1,2-propylene ketal), there are obtained the corresponding 3-alkylene ketals of 1β-methyl-11β,17α,21-trihydroxy-5β-pregnane-3,20-dione 21-acetate.

Similarly, using the above procedure but replacing 1β-methyl - 11β,21 - dihydroxy - 5β - pregn - 17(20) - en - 3-one 3-ethylene ketal 21-acetate by the corresponding 1α-epimer, there is obtained 1α-methyl-11β,17α,21-trihydroxy-5β-pregnane-3,20-dione 3-ethylene ketal 21-acetate.

*Example 7.—1β-methyl-11β,17α,21-trihydroxy-5β-pregnane-3,20-dione 21-acetate*

A solution of 2.05 g. of 1β-methyl-11β,17α,21-trihydroxy-5β-pregnane-3,20-dione 3-ethylene ketal 21-acetate in 15 ml. of acetone containing 1 ml. of N hydrochloric acid was allowed to stand overnight at room temperature. To the resulting solution was added water and the mixture was evaporated under reduced pressure to remove the acetone. The residue was filtered and the solid so obtained was dried and recrystallized from acetone. There was thus obtained 0.98 g. of 1β-methyl-11β,17α,21-trihydroxy-5β-pregnane-3,20-dione 21-acetate in the form of a crystalline solid having a melting point of 196.5 to 198° C. A second crop of 0.43 g. having a melting point of 192.5 to 196.5° C. was obtained from the mother liquors. An analytical sample having a melting point of 194.5 to 196.5° C. was obtained by further recrystallization from acetone.

*Analysis.*—Calcd. for $C_{24}H_{36}O_6$: C, 68.54; H, 8.63. Found: C, 68.63; H, 8.55.

The infrared spectrum of the compound (mineral oil mull) exhibited maxima at 3460, 3400, 1743, 1726, 1683, and 1272 reciprocal centimeters.

Using the above procedure other 3-alkylene ketals of 1β - methyl - 11β,17α,21 - trihydroxy - 5β - pregnane-3,20-dione 21-acetate are hydrolyzed to the free 3-keto compounds.

Similarly, using the above procedure but replacing 1β - methyl - 11β,17α,21 - trihydroxy - 5β - pregnane-3,20-dione 21-acetate 3-ethylene ketal by the corresponding 1α-epimer, there is obtained 1α-methyl-11β,17α,21-trihydroxy-5β-pregnane-3,20-dione 21-acetate.

*Example 8.—1β-methyl-17α,21-dihydroxy-5β-pregnane-3,11,20-trione 21-acetate*

To a solution of 0.25 g. of 1β-methyl-11β,17α,21-trihydroxy-5β-pregnane-3,20-dione 21-acetate in 5 ml. of acetone was added 0.125 ml. of 2.67 N solution of chromic acid in acetone. The mixture was allowed to stand at approximately 25° C. for 10 minutes before being diluted with water and cooled in the refrigerator. The solid which separated was isolated by filtration, washed with water, dried, and recrystallized from acetone. There was thus obtained 0.15 g. of 1β-methyl-17α,21-dihydroxy-5β-pregnane-3,11,20-trione 21-acetate in the form of a crystalline solid having a melting point of 239.5 to 242° C. A second crop (31 mg.) having a melting point of 237 to 240.5° C. was isolated from the mother liquors.

Analysis.—Calcd. for $C_{24}H_{34}O_6$: C, 68.87; H, 8.19. Found: C, 69.03; H, 8.65.

Using the above procedure, but replacing 1β-methyl-11β,17α,21-trihydroxy-5β-pregnane-3,20-dione 21-acetate by the corresponding 1α-epimer, there is obtained 1α-methyl - 17α,21 - dihydroxy - 5β - pregnane - 3,11,20-trione 21-acetate.

*Example 9.—1β-methylhydrocortisone 21-acetate*

A solution of 0.42 g. of 1β-methyl-11β,17α,21-trihydroxy-5β-pregnane-3,20-dione 21-acetate in 10 ml. of glacial acetic acid was treated, with stirring, with a microdrop of a solution of hydrogen bromide in acetic acid followed by the dropwise addition of 4.72 ml. of a freshly prepared 0.212 M solution of bromine in acetic acid at such a rate that the color of free bromine disappeared between the addition of each drop. When the addition was complete, the reaction mixture was poured into excess saturated brine solution and cooled in the refrigerator. The solid which separated was filtered, washed with water, dried, and then dissolved in 5 ml. of dimethylformamide. The resulting solution was treated at 60° C. under nitrogen with a solution of 0.4 g. of semicarbazide hydrochloride and 0.3 g. of sodium acetate in 2 ml. of water. The resulting solution was maintained at 60° C. for approximately 2 hr. before being treated with 1 ml. of 50 percent aqueous pyruvic acid solution and then maintained for a further 2 hr. at 60° C. The solution so obtained was then poured into an excess of brine and the mixture was cooled in the refrigerator. The solid which had separated was isolated by filtration and dried. The material (0.21 g.) so obtained was chromatographed on a column of aluminum silicate (Florisil) and the column was eluted with Skellysolve B containing increasing proportions of acetone. Those fractions of eluate which, on the basis of infrared and papergram analysis, were found to contain the desired product, were combined and evaporated to dryness. The residue was recrystallized from a mixture of acetone and Skellysolve B. There was thus obtained 51 mg. of 1β-methylhydrocortisone 21-acetate in the form of a crystalline solid having a melting point of 210.8 to 212° C. and having the analysis given below. A second crop (35 mg.) having a melting point of 203 to 210.5° C. was obtained from the mother liquors.

Analysis.—Calcd. for $C_{24}H_{34}O_6$: C, 68.87; H, 8.19. Found: C, 68.59; H, 7.89.

The ultraviolet spectrum of the compound (ethanol solution) exhibited a maximum at 247 millimicrons ($\epsilon=13,150$).

Using the above procedure, but replacing 1β-methyl-11β,17α,21-trihydroxy-5β-pregnane-3,20-dione 21-acetate by the corresponding 1α-epimer, there is obtained 1α-methylhydrocortisone 21-acetate.

*Example 10.—1β-methylcortisone 21-acetate*

Using the procedure described in Example 9, but replacing 1β-methyl-11β,17α,21-trihydroxy - 5β - pregnane-3,20-dione 21-acetate by 1β-methyl-17α,21-dihydroxy-5β-pregnane-3,11,20-trione 21-acetate, there was obtained 1β-methylcortisone 21-acetate acetone solvate in the form of a crystalline solid having a melting point of 212.5 to 214.5° C.

Analysis.—Calcd. for $C_{24}H_{32}O_6 \cdot CH_3COCH_3$: C, 68.33; H, 7.74. Found: C, 68.40; H, 7.59.

1β-methylcortisone 21-acetate, free from acetone, was obtained by heating the above solvate to constant weight in vacuo at 40° C.

In the above manner, using the 1α-epimer of the starting material, there is obtained 1α-methylcortisone 21-acetate.

*Example 11.—1β-methylhydrocortisone*

A solution of 5 g. of 1β-methylhydrocortisone 21-acetate in 500 ml. of water was purged with nitrogen and mixed with a similarly purged solution of 5 g. of potassium bicarbonate in 50 ml. of water. The resulting mixture was stirred under nitrogen for about 4 hr. and then neutralized by the addition of aqueous acetic acid. The methanol was then removed by distillation and the residue was cooled. The solid which separated was isolated by filtration, washed with water, and dried. The residue was recrystallized from aqueous ethanol. There was thus obtained 1β-methylhydrocortisone in the form of a crystalline solid.

Using the above procedure 1α-methylcortisone, 1β-methylcortisone and 1α-methylhydrocortisone are obtained by hydrolysis of the corresponding 21-acetates.

*Example 12.—1-methylprednisolone 21-acetate*

A mixture of 0.78 g. of 1β-methyl-11β,17α,21-trihydroxy-5β-pregnane-3,20-dione 21-acetate, 0.6 g. of selenium dioxide, 0.5 ml. of acetic acid and 50 ml. of tert.-butyl alcohol was heated under reflux under nitrogen for 7 hr. At the end of this time a further 0.6 g. of selenium dioxide was added and the mixture was heated under reflux under nitrogen for a further 2 days. At the end of this period the solvent was removed under reduced pressure and the residue was taken up in ethyl acetate. The ethyl acetate solution was filtered and the filtrate was washed successively with water, ammonium sulfide solution (three times), cold dilute ammonium hydroxide solution (twice), water, dilute hydrochloric acid, water, and saturated brine solution. The washed solution was dried over anhydrous sodium sulfate and filtered. The filtrate was evaporated to dryness and the residue was dissolved in methylene chloride and chromatographed on a column of magnesium silicate (Florisil). The column was eluted with Skellysolve B containing increasing proportions of acetone and those fractions which, on the basis of infrared and papergram analysis, were found to contain the desired product were evaporated to dryness and rechromatographed using the same procedure. There was thus obtained 1-methylprednisolone 21-acetate in the form of a crystalline solid with a melting point of 248° C. after melting at 231 to 239° C. and resolidifying. The infrared spectrum of the compound (mineral oil mull) exhibited maxima at 3425, 1750, 1725, 1659, 1619, 1265 and 1230 reciprocal centimeters. The ultraviolet spectrum of the compound (ethanol solution) exhibited a maximum at 253 millimicrons ($\epsilon=16,080$).

Using the above procedure, 1α- and 1β-methylhydrocortisone 21-acetate are converted to 1-methylprednisolone 21-acetate, and 1α- and 1β-methylcortisone 21-acetate, as well as 1α- and 1β-methyl-17α,21-dihydroxy-5β-pregnane-3,11,20-trione 21-acetate, are converted to 1-methylprednisone 21-acetate.

*Example 13.—1-methylprednisolone*

Using the procedure described in Example 11, 1-methylprednisolone 21-acetate is hydrolyzed to 1-methylprednisolone.

In similar manner 1-methylprednisone 21-acetate is hydrolyzed to 1-methylprednisone.

*Example 14.—1-methylprednisolone 21-propionate*

A mixture of 0.5 g. of 1-methylprednisolone, 5 ml. of pyridine and 5 ml. of propionic anhydride is allowed to stand for several hours at room temperature before being poured into excess water. The solid which separates is isolated by filtration, washed with water, and recrystallized from aqueous ethanol to obtain 1-methylprednisolone 21-propionate in the form of a crystalline solid.

Using the above procedure but replacing 1-methylprednisolone by 1-methylprednisone, 1(α and β)-methylhydrocortisone, and 1(α and β)-methylcortisone, there are obtained the 21-propionates of these compounds.

Similarly by reacting 1-methylprednisone, 1-methylprednisolone, 1(α and β)-methylhydrocortisone, and 1(α and β)-methylcortisone, with the appropriate acid anhydride or acid halide under the conditions described above there are obtained the corresponding 21-acylates thereof such as the butyrate, isobutyrate, valerate, isovalerate, trimethylacetate, hexanoate, heptanoate, cyclopentylpropionate, benzoate, naphthoate, phenylacetate, phenylpropionate, hemisuccinate, hemiglutarate, and the like.

*Example 15.—1α-methyl-17α,21-dihydroxypregna-4,9(11)-diene-3,20-dione 21-acetate*

To a solution of 0.82 g. of 1α-methylhydrocortisone 21-acetate in 5 ml. of pyridine is added 0.56 g. of N-bromoacetamide. The mixture is allowed to stand at room temperature for a short period before being cooled to about 5 to 10° C. Sulfur dioxide is then passed over the surface of the reaction mixture with shaking of the latter until the reaction mixture gives no blue color with acidified starch iodide paper. During the treatment with sulfur dioxide the reaction mixture becomes warm and the temperature is maintained under 30° C. by cooling and by regulating the rate of passage of sulfur dioxide. When the sulfur dioxide treatment has been completed the resulting mixture is treated with excess ice water and the solid which separates is isolated by filtration, washed with water, dried, and recrystallized. There is thus obtained 1α-methyl-17α,21-dihydroxypregna-4,9(11)-diene-3,20-dione 21-acetate.

Using the above procedure, but replacing 1α-methylhydrocortisone 21-acetate by 1β-methylhydrocortisone 21-acetate or 1-methylprednisolone 21-acetate, there are obtained 1β-methyl-17α,21-dihydroxypregna-4,9(11)-diene-3,20-dione 21-acetate and 1-methyl-17α,21-dihydroxypregna-1,4,9(11)-triene-3,20-dione 21-acetate, respectively.

*Example 16.—1α-methyl-9α-bromohydrocortisone 21-acetate*

To a solution of 0.55 g. of 1α-methyl-17α,21-dihydroxypregna-4,9(11)-diene-3,20-dione 21acetate in 10 ml. of methylene chloride and 25 ml. of tert.-butyl alcohol is added a solution of 1.4 ml. of 72 percent perchloric acid in 10 ml. of water followed by a solution of 0.24 g. of N-bromoacetamide in 6 ml. of tert.-butyl alcohol. The resulting mixture is stirred for approximately 15 minutes at room temperature before adding thereto a solution of 0.28 g. of sodium sulfite in 14 ml. of water. The resulting mixture is distilled under reduced pressure to remove organic solvents and the residue is diluted with water. The solid which separates is isolated by filtration, washed with water, and dried. There is thus obtained 1α-methyl-9α-bromohydrocortisone 21-acetate in the form of a white solid.

Using the above procedure, but replacing N-bromoacetamide by N-chlorosuccinimide and N-iodosuccinimide, there are obtained 1α-methyl-9α-chlorohydrocortisone 21-acetate and 1α-methyl-9α-iodohydrocortisone 21-acetate.

Using the above procedure, but replacing 1α-methyl-17α,21-dihydroxypregna-4,9(11)-diene-3,20-dione 21-acetate by 1β-methyl-17α,21-dihydroxypregna-4,9(11)-diene-3,20-dione 21-acetate and 1-methyl-17α,21-dihydroxypregna-1,4,9(11)-triene-3,20-dione 21-acetate, there are obtained 1β-methyl-9α-bromohydrocortisone 21-acetate and 1-methyl-9α-bromoprednisolone 21-acetate, respectively. The corresponding 9α-chloro- and 9α-iodo derivatives can be obtained using N-chlorosuccinimide or N-iodosuccinimide in the above preparation in place of N-bromoacetamide.

*Example 17.—1α-methyl-9β,11β-epoxy-17α,21-dihydroxypregn-4-ene-3,20-dione 21-acetate*

To a solution of 0.65 g. of 1α-methyl-9α-bromohydrocortisone 21-acetate in 20 ml. of acetone is added 0.68 g. of potassium acetate and the mixture is heated under reflux for 17 hr. The resulting product is concentrated under reduced pressure and the concentrate is diluted with water and extracted with methylene chloride. The methylene chloride extract is dried over anhydrous sodium sulfate and the dried solution is evaporated to dryness. The residue is chromatographed on a column of magnesium silicate (Florisil) and the column is eluted with Skellysolve B containing increasing proportions of acetone. Those fractions of the eluate which are found, on the basis of infrared and chromatographic analysis, to contain the desired epoxide are combined and evaporated to dryness. There is thus obtained 1α-methyl-9β,11β-epoxy-17α,21-dihydroxypregn-4-ene-3,20-dione 21-acetate in the form of a white solid.

Using the above procedure, but replacing the 9α-bromo starting material by the corresponding 9α-chloro or 9α-iodo compound, yields the same end product.

Using the above procedure, but replacing 1α-methyl-9α-bromohydrocortisone 21-acetate by 1β-methyl-9α-bromo (or chloro or iodo)-hydrocortisone 21-acetate or by 1-methyl-9α-bromo (or chloro or iodo) prednisolone 21-acetate, there are obtained 1β-methyl-9β,11β-epoxy-17α,21-dihydroxypregn-4-ene-3,20-dione 21-acetate and 1-methyl-9β,11β - epoxy - 17α,21 - dihydroxypregna-1,4-diene-3,20-dione 21-acetate, respectively.

*Example 18.—1α-methyl-9α-fluorohydrocortisone 21-acetate*

To approximately 1.3 g. of liquid anhydrous hydrogen fluoride in a polyethylene bottle maintained at minus 60° C. is added 2.3 ml. of tetrahydrofuran followed by a solution of 0.5 g. of 1α-methyl-9β,11β-epoxy-17α,21-dihydroxypregn-4-ene-3,20-dione 21-acetate in 2 ml. of methylene chloride. The resulting mixture is maintained at approximately minus 30° C. for several hours before being treated cautiously with an excess of cold sodium bicarbonate solution. The mixture so obtained is extracted with methylene chloride and the methylene chloride extract is washed with water, dried over anhydrous sodium sulfate and concentrated. The concentrate is chromatographed on a column of magnesium silicate (Florisil) and the column is eluted with Skellysolve B containing increasing proportions of acetone. Those fractions which, on the basis of infrared and papergram analysis, were found to contain the desired compound were combined and evaporated to dryness. There was thus obtained 1α-methyl-9α-fluorohydrocortisone 21-acetate.

Using the above procedure, but replacing 1α-methyl-9β,11β - epoxy - 17α,21-dihydroxypregn-4-ene-3,20-dione 21-acetate by the corresponding 1β-epimer or by 1-methyl-9β,11β - epoxy - 17α,21 - dihydroxypregna-1,4-diene-3,20-dione 21-acetate, there are obtained 1β-methyl-9α-fluorohydrocortisone 21-acetate and 1-methyl-9α-fluoroprednisolone 21-acetate, respectively.

*Example 19.—1α-methyl-9α-fluorocortisone 21-acetate*

Using the procedure described in Example 8, but replacing 1α - methyl - 11β,17α,21-trihydroxy-5β-pregnane-3,20-dione 21-acetate by 1α-methyl-9α-fluorohydrocortisone 21-acetate, there is obtained 1α-methyl-9α-fluorocortisone 21-acetate.

Using the same procedure, 1β-methyl-9α-fluorohydrocortisone 21-acetate, 1-methyl-9α-fluoroprednisolone 21-acetate, 1α-methyl-9α-bromohydrocortisone 21-acetate and 1α-methyl-9α-chlorohydrocortisone 21-acetate are oxidized to 1β-methyl-9α-fluorocortisone 21-acetate, 1-methyl-9α-fluoroprednisone 21-acetate, 1α-methyl-9α-bromocortisone 21-acetate, and 1α-methyl-9α-chlorocortisone 21-acetate, respectively.

Example 20.—1α-methyl-9α-fluorohydrocortisone

Using the procedure described in Example 11, but replacing 1α-methylhydrocortisone 21-acetate by 1α-methyl-9α-fluorohydrocortisone 21-acetate, there is obtained 1α-methyl-9α-fluorohydrocortisone.

Using the same procedure, 1β-methyl-9α-fluorohydrocortisone, 1α-methyl-9α-fluorocortisone, 1α-methyl-9α-bromohydrocortisone, 1-methyl-9α-fluoroprednisolone, 1-methyl-9α-fluoroprednisone, and 1α-methyl-9α-chlorohydrocortisone are obtained by hydrolysis of the corresponding 21-acetates.

Example 21.—1α-methyl-9α-fluorohydrocortisone 21-propionate

Using the procedure described in Example 14, but replacing 1-methylprednisolone by 1α-methyl-9α-fluorohydrocortisone, there is obtained 1α-methyl-9α-fluorohydrocortisone 21-propionate.

Similarly, by reacting 1α-methyl-9α-fluorohydrocortisone, 1α-methyl-9α-fluorocortisone, 1β-methyl-9α-fluorohydrocortisone, 1-methyl-9α-fluoroprednisolone, 1-methyl-9α-fluoroprednisone, 1α-methyl-9α-chlorohydrocortisone, and the like 9α-halo compounds of the invention, with the appropriate hydrocarbon carboxylic acid anhydride or halide under the conditions of Example 14 there are obtained the corresponding 21-acylates thereof such as the butyrate, isobutyrate, valerate, isovalerate, trimethylacetate, hexanoate, heptanoate, cyclopentylpropionate, benzoate, naphthoate, phenylacetate, phenylpropionate, hemisuccinate, hemiglutarate, and the like.

Example 22.—1-methyl-1,4-pregnadiene-3,11,20-trione

A stirred mixture of 3 g. of 1β-methyl-5β-pregnane-3,11,20-trione 20-ethylene ketal, 1.8 g. of selenium dioxide, 0.6 ml. of pyridine and 200 ml. of t.-butyl alcohol was heated under reflux in an atmosphere of nitrogen for 30 hr. The cooled reaction mixture was then filtered and the filtrate was evaporated to dryness under reduced pressure. The residue was taken up in ethyl acetate, treated with decolorizing charcoal, and filtered. The filtrate was washed successively with water, freshly prepared ammonium sulfide solution, cold 17 percent aqueous ammonium hydroxide, water, dilute hydrochloric acid, water, and saturated brine solution, and then dried over anhydrous sodium sulfate. The dried solution was filtered and the filtrate was evaporated to dryness under reduced pressure. The residue was dissolved in methylene chloride and chromatographed on a column of magnesium silicate (Florisil). The column was eluted with Skellysolve B containing increasing proportions of acetone. Those fractions of the eluate which, on the basis of infrared and papergram analysis, were found to contain the desired compound were combined and evaporated to dryness. The residue was recrystallized from Skellysolve B containing acetone. There was thus obtained 0.41 g. of 1-methyl-1,4-pregnadiene-3,11,20-trione 20-ethylene ketal in the form of a crystalline solid having a melting point of 165 to 172.5° C. An analytical sample having a melting point of 176 to 177.8° C. was obtained by further recrystallization from the same solvent mixture.

*Analysis.*—Calcd. for $C_{24}H_{32}O_4$: C, 74.97; H, 8.39. Found: C, 74.77; H, 8.33.

The infrared spectrum of the compound (mineral oil mull) exhibited maxima at 3020, 2990, 1710, 1668, 1622 and 1603 reciprocal centimeters. The ultraviolet spectrum of the compound (ethanol solution) exhibited a maximum at 244 millimicrons ($\epsilon$=16,950).

The 20-ketal (0.34 g.) so obtained was dissolved in 20 ml. of acetone containing 1 ml. of 3 N hydrochloric acid and the solution was allowed to stand overnight. The solution so obtained was diluted with water and evaporated under reduced pressure. The residue was chromatographed on a column of magnesium silicate (Florisil) and the column was eluted with Skellysolve B containing increasing proportions of acetone. Those fractions which, on the basis of infrared and papergram analysis, were found to contain the desired product were combined and evaporated to dryness. There was thus obtained 0.17 g. of 1-methyl-1,4-pregnadiene-3,11,20-trione in the form of a crystalline solid having a melting point of 194 to 195.5° C. An analytical sample having a melting point of 194.5 to 195.2° C. was obtained by further recrystallization from the same solvent mixture.

*Analysis.*—Calcd. for $C_{22}H_{28}O_3$: C, 77.61; H, 8.29. Found: C, 77.22; H, 8.38.

The infrared spectrum of the compound (mineral oil mull) exhibited maxima at 3060, 3020, 1711, 1702, 1658, 1602, and 1600 reciprocal centimeters. The ultraviolet spectrum of the compound (ethanol solution) exhibited a maximum at 244 millimicrons ($\epsilon$=17.650).

We claim:
1. A 1-methylpregnane having the formula

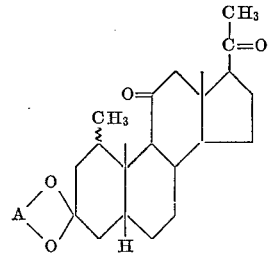

wherein A is an alkylene radical containing from 2 to 6 carbon atoms, inclusive, wherein the attaching oxygen to carbon bonds are separated by a chain of from 2 to 3 carbon atoms.

2. 1β-methyl-5β-pregnane - 3,11,20 - trione 3-ethylene ketal.

3. A process which comprises reacting 5β-pregn-1-ene-3,11,20-trione 20-alkylene ketal wherein the alkylene radical contains from 2 to 6 carbon atoms, inclusive, and the attaching oxygen to carbon bonds are separated by a chain of from 2 to 3 carbon atoms, with a methylmagnesium halide in the presence of a cuprous halide to produce the corresponding 1-methyl-5β-pregnane-3,11,20-trione 20-alkylene ketal.

References Cited by the Examiner

UNITED STATES PATENTS

| | | | |
|---|---|---|---|
| 2,883,400 | 4/59 | Eppstein et al. | 260—397.3 |
| 2,891,080 | 6/59 | Bloom et al. | 260—397.45 |
| 2,894,007 | 7/59 | Graber et al. | 260—397.45 |
| 2,913,457 | 11/59 | Fonken et al. | 260—239.55 |

OTHER REFERENCES

Fieser et al., Steroids, 1959, pages 602, 603, 686 and 692–696, Reinhold Pub. Company, New York, N.Y.

Shoppe, Chemistry of Steroids, 1958, page 204, Butterworths Scientific Pub., London.

LEWIS GOTTS, *Primary Examiner.*

IRVING MARCUS, *Examiner.*